(12) United States Patent
Wichmann

(10) Patent No.: US 7,156,321 B2
(45) Date of Patent: Jan. 2, 2007

(54) ACTIVE COMPOUND SUPPLY SYSTEM AND SPRAYING DEVICE FOR SPRAYING LIQUIDS

(75) Inventor: Wolf-Dieter Wichmann, Neetzow (DE)

(73) Assignee: Lechler GmbH, Metzingen (DE)

( * ) Notice: Subject to any disclaimer, the term of this patent is extended or adjusted under 35 U.S.C. 154(b) by 100 days.

(21) Appl. No.: 11/233,226

(22) Filed: Sep. 22, 2005

(65) Prior Publication Data

US 2006/0086296 A1 Apr. 27, 2006

Related U.S. Application Data

(60) Provisional application No. 60/612,341, filed on Sep. 23, 2004.

(51) Int. Cl.
*B05B 7/26* (2006.01)
*B05B 9/06* (2006.01)
*B05B 12/14* (2006.01)
*A01M 7/00* (2006.01)
*A01M 21/00* (2006.01)

(52) U.S. Cl. ............ 239/159; 239/172; 239/726; 239/754; 239/550; 239/569; 239/DIG. 15

(58) Field of Classification Search ........ 111/118–127, 111/7.1–7.4, 200, 900; 239/146–176, 722–754, 239/289, 548–586, DIG. 1, DIG. 15
See application file for complete search history.

(56) References Cited

FOREIGN PATENT DOCUMENTS

| DE | 83 25 036 | | 4/1985 |
|---|---|---|---|
| DE | 85 00 804 | U1 | 5/1985 |
| DE | 39 38 673 | | 5/1991 |
| DE | 199 04 102 | A1 | 8/2000 |
| DE | 103 12 930 | A1 | 10/2004 |
| EP | 0 323 205 | B1 | 3/1993 |
| EP | 0 440 589 | B1 | 4/1994 |
| FR | 1422705 | | 12/1965 |
| WO | WO 01 95714 | A1 | 12/2001 |

*Primary Examiner*—Christopher J. Novosad
(74) *Attorney, Agent, or Firm*—Flynn, Thiel, Boutell & Tanis, P.C.

(57) ABSTRACT

An active compound supply system for a spraying device for spraying liquids, in particular for agricultural purposes, includes a carrier liquid tank, a carrier liquid pump, a plurality of spray nozzles and a carrier liquid line for connecting the carrier liquid tank, the carrier liquid pump and the spray nozzles. The system provides at least one active compound preliminary container, at least one metering pump for feeding active compound into the carrier liquid and an active compound forward-flow line from the active compound preliminary container to the metering pump.

26 Claims, 7 Drawing Sheets

Fig.: 1
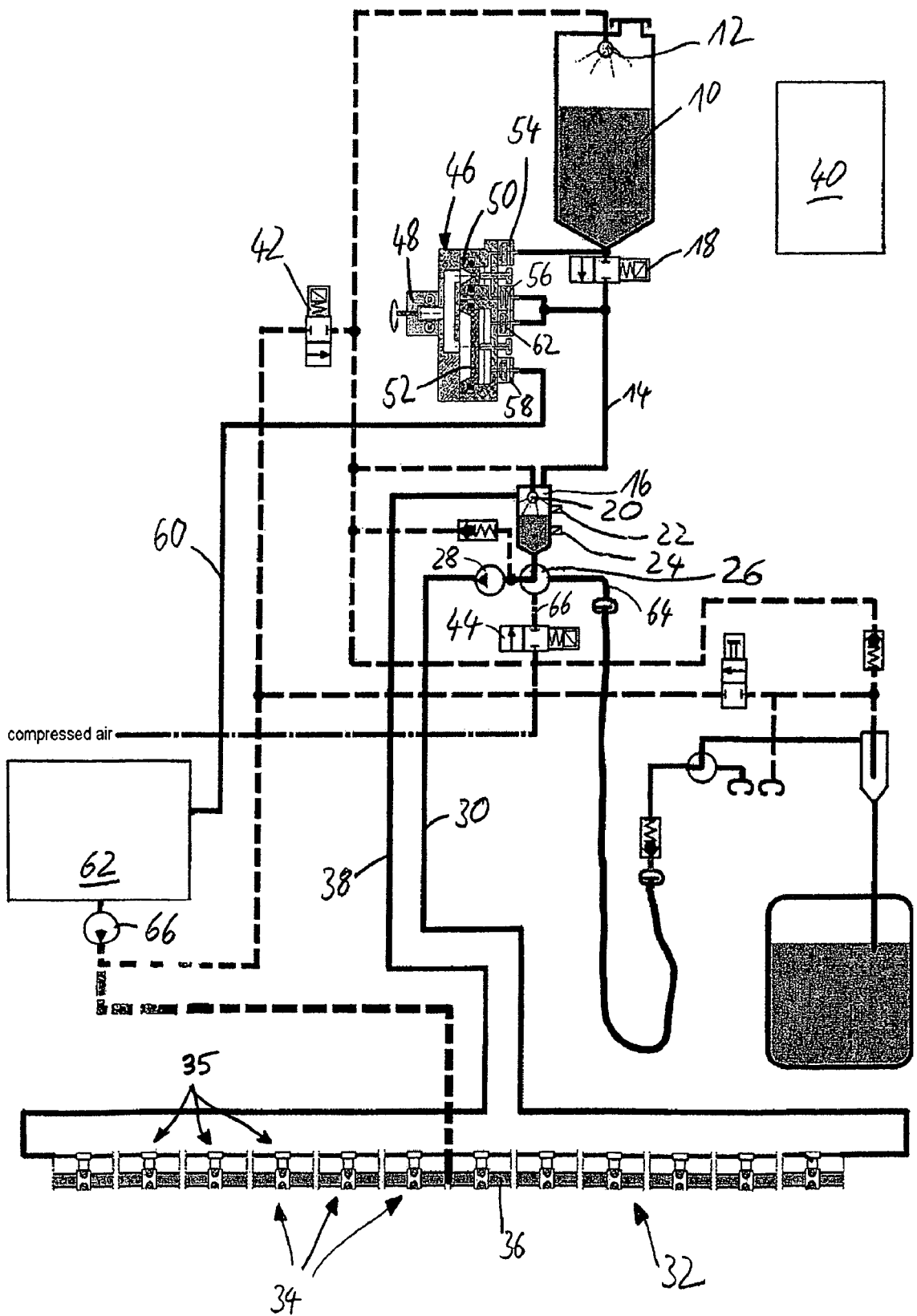

Fig.: 2
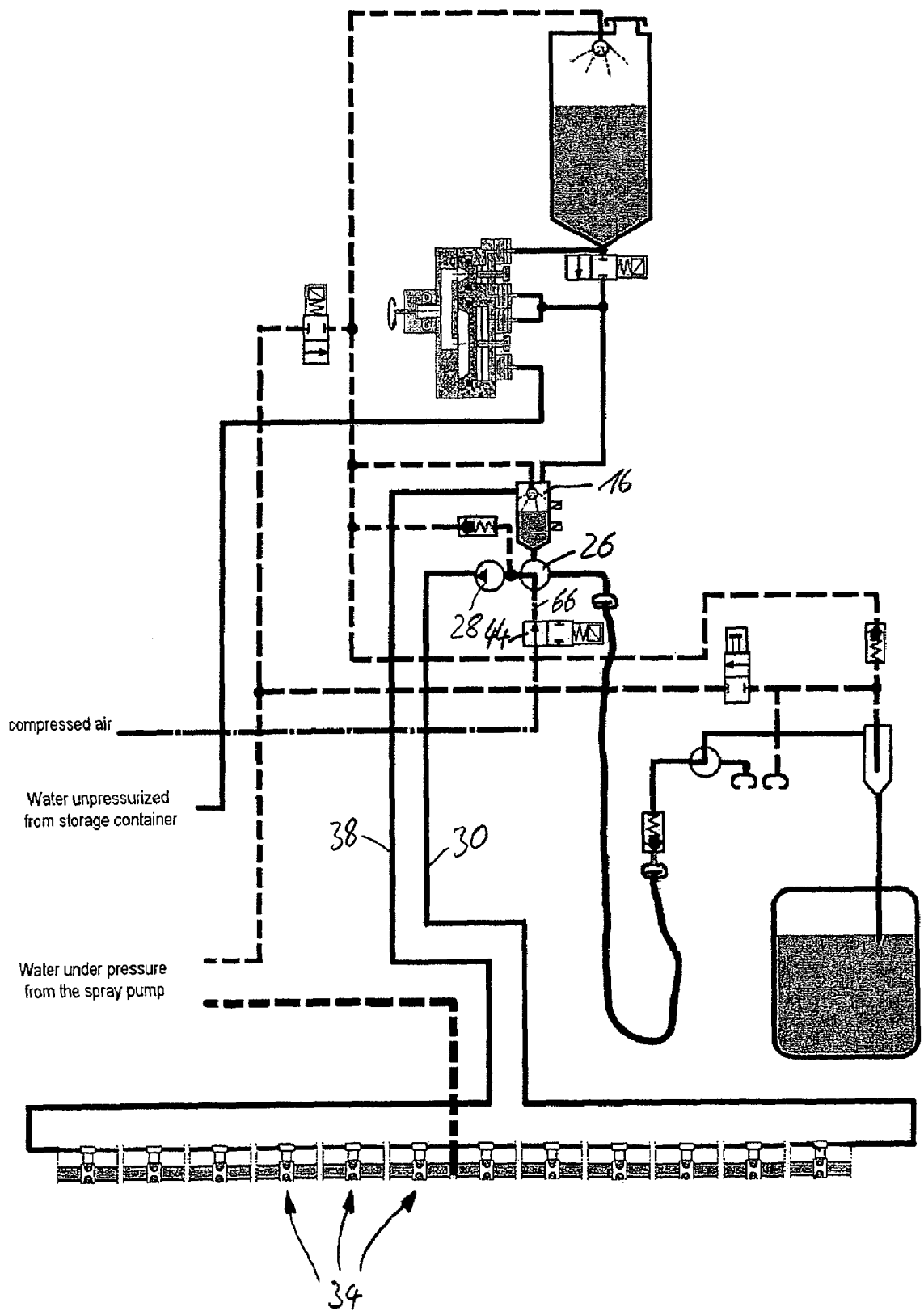

Fig.: 3
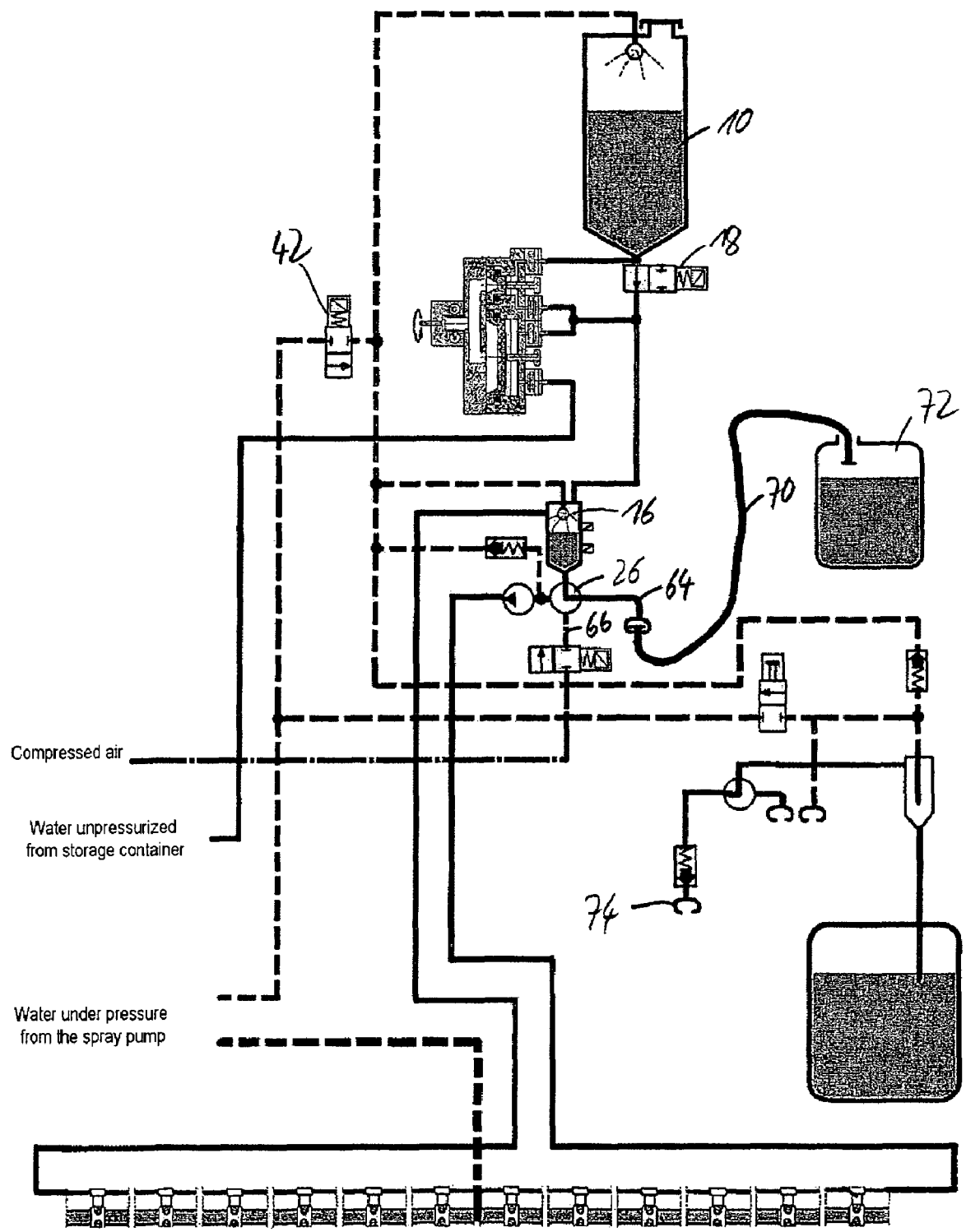

Fig.: 4
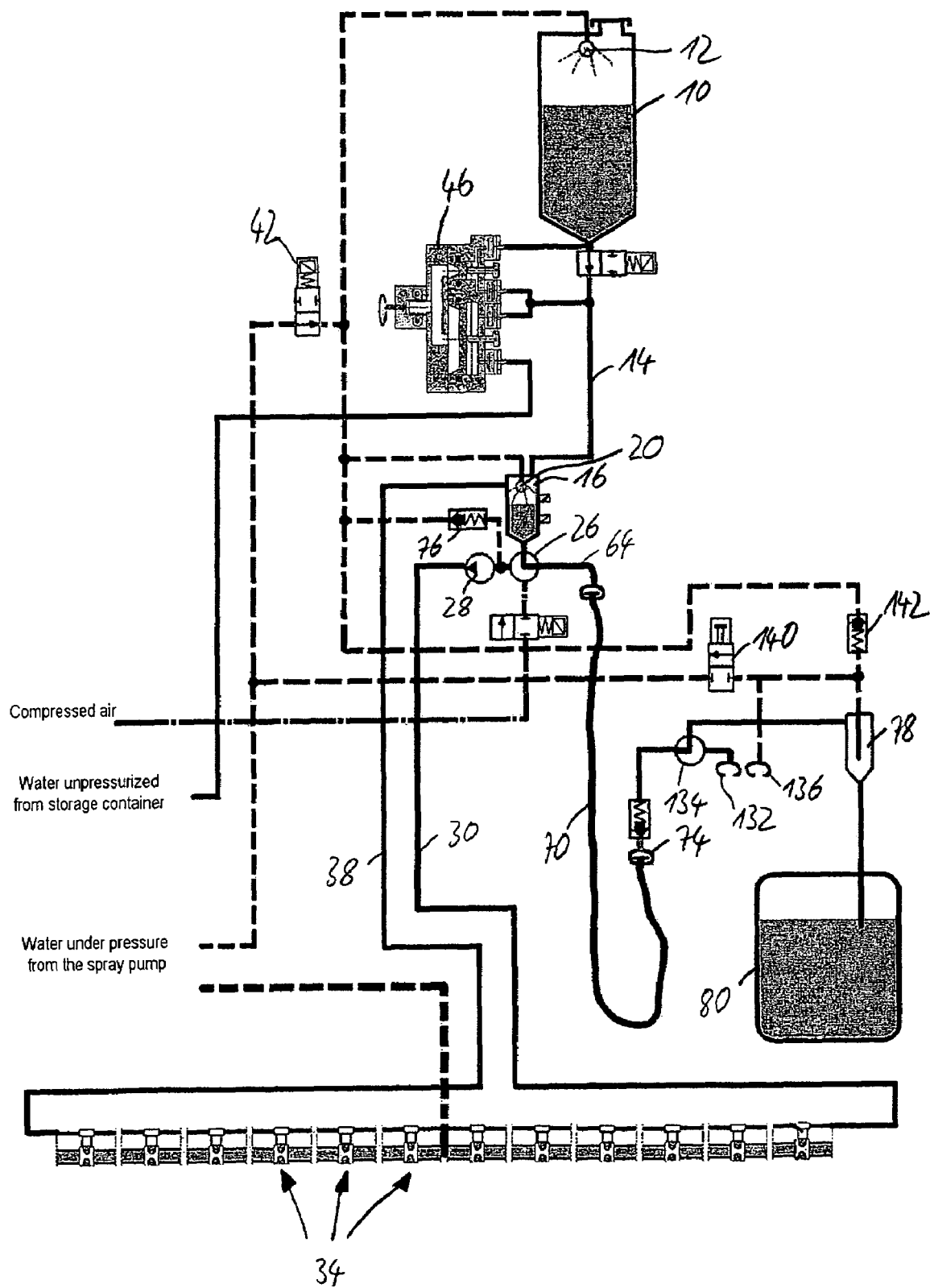

Fig.: 5
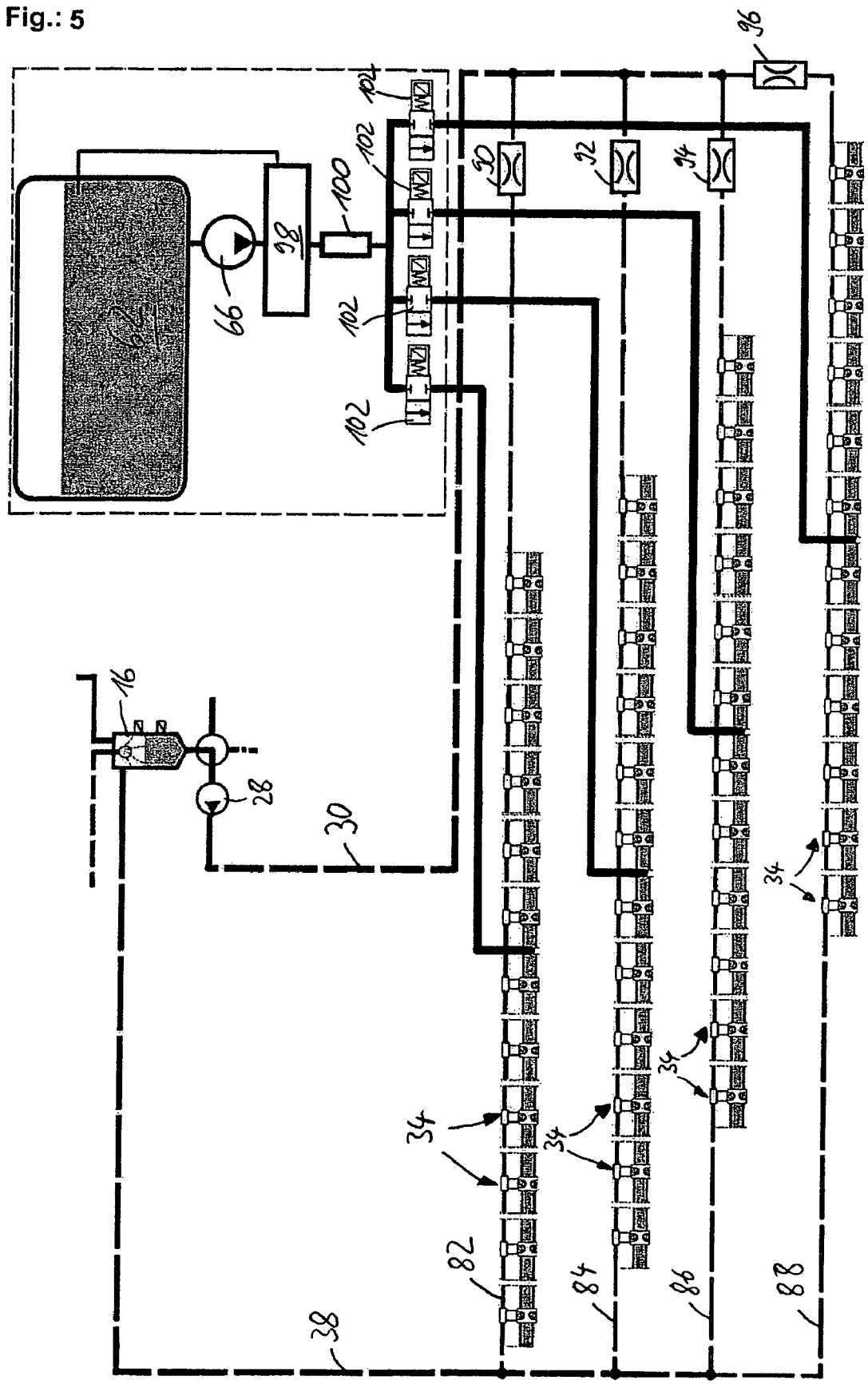

Fig.: 6
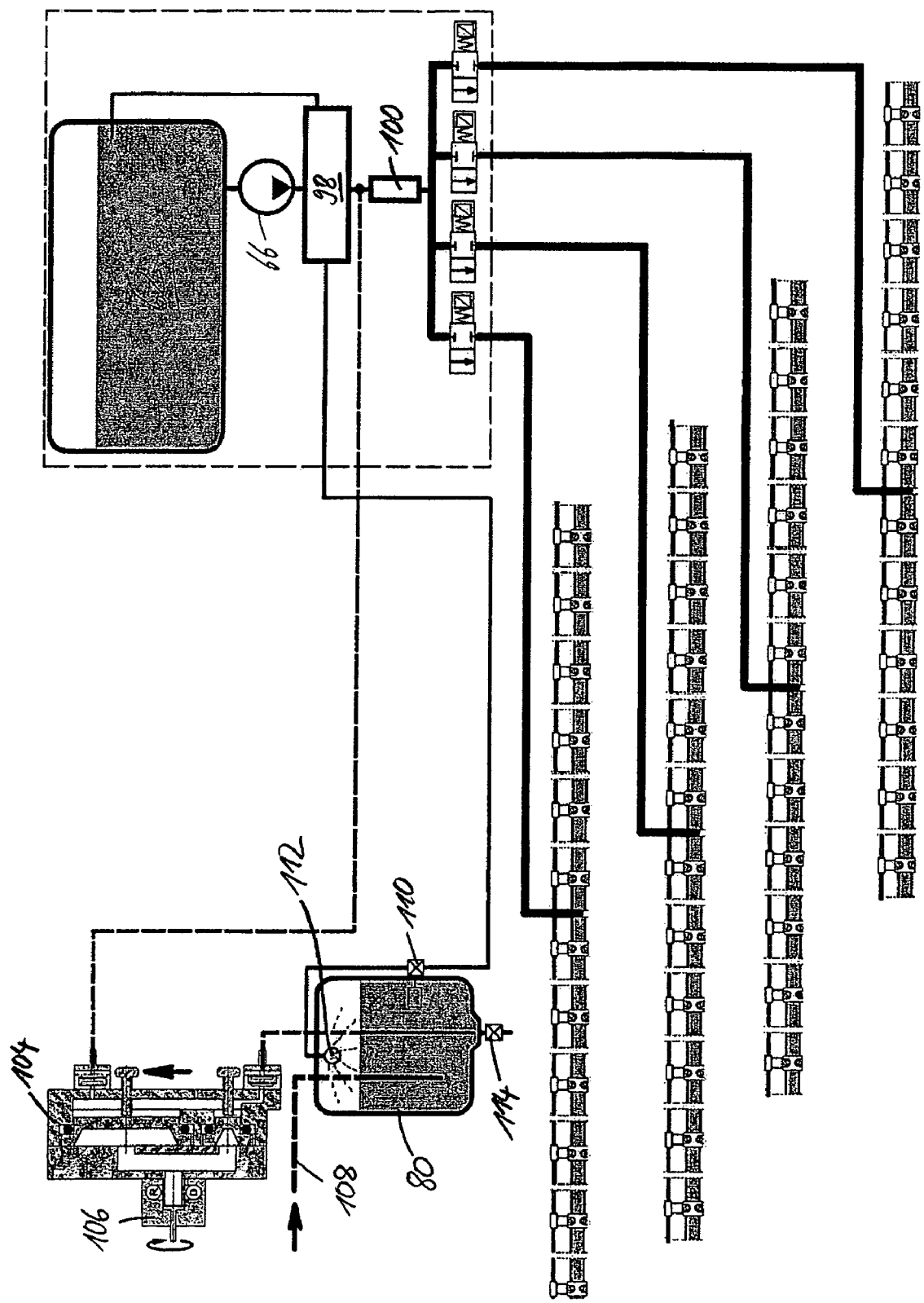

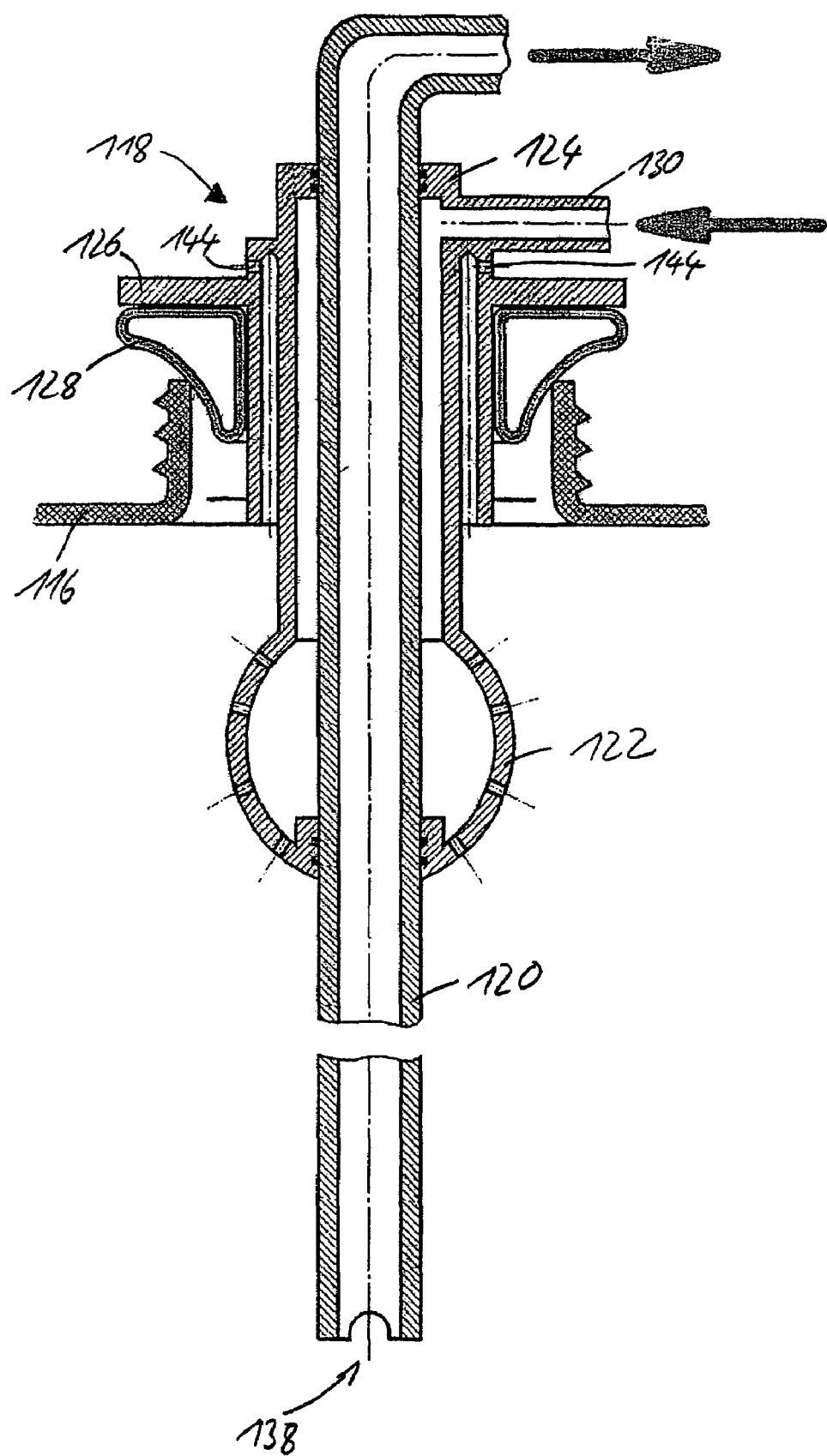
Fig.: 7

ACTIVE COMPOUND SUPPLY SYSTEM AND SPRAYING DEVICE FOR SPRAYING LIQUIDS

CROSS-REFERENCE TO RELATED APPLICATIONS

This application claims the benefit of U.S. Provisional Application Ser. No. 60/612,341, filed Sep. 23, 2004, which is incorporated herein in its entirety.

FIELD OF THE INVENTION

The invention relates to an active compound supply system and to a spraying device for spraying liquids, in particular for agricultural purposes, having a carrier liquid tank, a carrier liquid pump, a plurality of spray nozzles and a carrier liquid line for connecting the carrier liquid tank, the carrier liquid pump and the spray nozzles.

BACKGROUND OF THE INVENTION

Spraying devices of this type are to be found, for example, on what are referred to as field sprayers which are self-propelling or are conveyed behind towing vehicles and are used for applying crop protection agents. Field sprayers of this type conventionally have a foldable linkage, with working widths of up to 36 m being used. In the case of conventional field sprayers, a crop protection agent which is to be sprayed is mixed with water before the beginning of spraying, so that then a ready-mixed mixture of active compound and carrier liquid is present in a spray mixture tank. Conventional spraying devices of this type are problematic if the active compound concentration is to be changed during the spraying. Also if the crop protection agent to be sprayed is to be changed, the entire system has to be emptied and cleaned beforehand.

SUMMARY OF THE INVENTION

The intention of the invention is to provide an improved active compound supply system and an improved spraying device.

For this purpose, the invention provides an active compound supply system for a spraying device for spraying liquids, in particular for agricultural purposes, having a carrier liquid tank, a carrier liquid pump, a plurality of spray nozzles and a carrier liquid line for connecting the carrier liquid tank, the carrier liquid pump and the spray nozzles, in which at least one active compound preliminary container, at least one metering pump for feeding active compound into the carrier liquid and an active compound forward-flow line from the active compound preliminary container to the metering pump are provided.

Such a design of an active compound supply system makes direct metering of crop protection agent possible, so that the mixture of active compound and carrier liquid is not produced until directly before the spraying. The mixing of carrier liquid and active compound can take place in a mixing chamber which is arranged, for example, either directly upstream of a branching into the individual partial width sections or even on the spray linkage, directly upstream of the individual spray nozzles. An extremely precise metered addition of active compound to the carrier liquid can be achieved if the metering pumps are pulse-controlled and, per pulse, inject an exactly defined amount of liquid into the carrier liquid flow. A suitable active compound concentration can then be set as a function of the required active compound concentration, the carrier liquid flow present currently and, optionally, the current traveling speed. With such an active compound supply system or such a spraying device, an even short-term changing of the active compound concentration during the spraying is possible. It is also possible to feed in a plurality of active compounds at the same time in changing mixing ratios, and the conditions are provided to vary the applied spray agent concentration as a function of the crop stock just sprayed or else in order to carry out a "treatment specific to a partial area".

In a development of the invention, an active compound return-flow line from the metering pump to the active compound preliminary container is provided.

Provision of an active compound return-flow line enables the active compound to circulate between the metering pump and the active compound preliminary container. As a result, it is possible, on the one hand, to deliver the active compound even before the beginning of spraying to the metering pump, which can be situated, for example, immediately in the vicinity of the spray nozzles. This makes it possible, in the case of suspensions, to prevent particles from being deposited in the active compound lines. In this case, the active compound preliminary container can act on the field sprayer as the sole active compound container for a particular active compound, in which case separate active compound containers and active compound forward-flow lines and active compound return-flow lines are to be provided for a plurality of active compounds.

In a development of the invention, there is an active compound storage container which is connected to the active compound preliminary container by means of a line which can be shut off.

This creates the possibility of holding only relatively small amounts of active compound in the active compound preliminary container, since the active compound can be topped up from the active compound container depending in each case on the filling level. This provides the preconditions for operating with a filling level in the active compound preliminary container, which level moves within defined limits, during the spraying operation.

In a development of the invention, there is a predilution pump which can be connected, on the one hand, to the carrier liquid tank and, on the other hand, to the active compound storage container, which can be operated in order to produce a mixture of carrier liquid and active compound with a defined composition, and the outlet side of which can be connected to the active compound storage container.

On account of the extremely large range of active compound concentration in agricultural technology, which range is usually stated in liters per hectare and which extends from approximately 200 ml per hectare to 6 l per hectare, for extremely low metering specifications the possibility has to be provided of feeding the active compound in an already pre-diluted state into the active compound preliminary container. This is because, even though the metering pumps in principle can keep exactly to even an extremely low metered-in addition sufficient mixing can no longer be obtained in the case of very small metered portions since the active compound is added, for example, only upstream of the branching into the individual partial width sections or even directly upstream of the spray nozzles. This is because use is advantageously made of pulse-controlled metering pumps. For high metered portions the active compound volume metered in per working stroke should therefore not drop below a certain value. In the case of very small metered portions, the intervals between individual working strokes would then be too large to ensure sufficient mixing. However, provision of a predilution pump between the active compound storage container and the active compound preliminary container makes it possible to obtain an exactly defined predilution, so that even very low metering specifications can be kept to precisely. The predilution pump also advantageously operates under pulse control. In order to be able to feed in a plurality of different active compounds in a pre-diluted state, separate predilution pumps are provided between the particular active compound container and the particular active compound preliminary container.

In a development of the invention, the at least one metering pump is provided in the region of a nozzle holder for one or more spray nozzles, and the active compound forward-flow line and the active compound return-flow line form at least part of a circulation line into which the at least one metering pump is connected.

It is thereby possible not to undertake the feeding in of the active compounds until directly at the nozzle holder and nevertheless to ensure that all of the metering pumps are supplied with a uniform active compound concentration before the beginning of spraying. The arrangement of the metering pumps directly on the nozzle holder permits extremely short reaction times should it be necessary to change the active compound concentration. In addition, after spraying is finished, no residual amounts of carrier liquid contaminated with active compound are obtained.

In a development of the invention, the plurality of spray nozzles are arranged on a spray linkage in partial width sections, the circulation line having a plurality of parallel secondary lines which connect the active compound forward-flow line and the active compound return-flow line.

By provision of such secondary lines, in which case, for example, one parallel secondary line is provided per partial width section, a uniform supply of active compound of the metering pumps on the spray linkage can be obtained even in the case of very large working widths of a field sprayer.

In a development of the invention, a different secondary line of the circulation line is provided for each partial width section. As an alternative, it is also possible for secondary lines to be provided corresponding to the envisaged folding of the linkage, with the result that, in the case of relatively small linkage widths, a division into three secondary circuits, necessitated by the folding of the linkage, is sufficient. Each secondary line advantageously has a throttle value upstream of the respectively associated metering pumps.

As a result a reliable and uniform supplying of the secondary circuits from the main circuit can be ensured. In this case, the sum total of the volumetric flows of all the throttle valves is expediently approximately 20% below the average delivery power of a loading and circulation pump in the active compound circulation line in order to ensure a rapid and uniform distribution of the active compound.

Advantageously, the active compound container has at least two level sensors arranged on a different level, the metering pump delivers a defined amount of active compound per working stroke, and a control unit is provided which detects and evaluates the number of working strokes on/or the time taken for a level reduction between the level of the first and second level sensors in the active compound preliminary container.

By means of these measures, a simultaneous calibration is possible during the spraying operation, with the result that it is precisely in the case of very low metering specifications that keeping exactly to them can also be monitored during the spraying operation. By detection of the number of working strokes for a filling level reduction over a known, predefined volume, the volumetric amount delivered per working stroke by the metering pumps can be monitored. If, in addition or as an alterative, the time required for reducing the filling level is also monitored, this may be set, for example, in relation to the amount of carrier liquid sprayed over this period of time in order then to monitor that the predetermined metered portion is being kept to.

In a development of the invention, an active compound storage container which can be connected to the active compound preliminary container is provided, and the control unit detects and evaluates a time which passes between the first level and the second level when filling the active compound preliminary container from the active compound storage container.

This makes further monitoring functions possible. Thus, for example when an average quantity for topping up the active compound preliminary container is exceeded, it can be assumed that the active compound storage container is empty, or a filling valve or a predilution pump is clogged up or malfunctioning. If, for example, the time between successive topping up operations of the active compound preliminary container is also detected and evaluated, it may be likely, if an average quantity is exceeded, that one or more metering pumps or the drive thereof has malfunctioned, since too little active compound is then delivered through the metering pumps. If the topping up takes place in considerably shorter periods of time than on average, then it can generally be assumed that there is a leakage in the active compound system. In every case, a warning signal can be output to inform an operator.

Advantageously, a disposal container for collecting residual amounts of a mixture of carrier liquid and active compound, in particular from flushing operations, and a return metering pump are provided, it being possible for the return metering pump to be connected, on the one hand, to the disposal container and, on the other hand, to the carrier liquid line.

By provision of a disposal container, flushing mixture which is obtained, for example during flushing of the field sprayer, can be carried along on the field sprayer in collected form and can be disposed of and does not inevitably, as in the case of conventional field sprayers, have to be discharged immediately during a spraying journey. It is to be stressed here that the amount of flushing mixture is significantly smaller in comparison to conventional field sprayers, since only the active compound lines and optionally the lines downstream of a mixing chamber have to be flushed. However, the active compound lines naturally have a substantially smaller diameter than the spray mixture lines of conventional field sprayers, with the result that the amount of flushing mixture obtained is also significantly smaller. The provision of a return metering pump then makes it possible to add the content of the disposal container in metered fashion to the carrier liquid flow, for example during the next spraying operation, in which case care should be taken to ensure that the content of the disposal container is added to the carrier liquid flow in an ineffective dilution.

In a development of the invention, a control unit for activating the return metering pump is provided.

This makes it possible for the return metering pump to be activated variably, and an ineffective dilution of the residual amounts can always be ensured even in the case of particularly hazardous active compounds. The return metering during the spraying operation dispenses with the necessity of carrying out flushing trips, with the result that the nonproductive times of the field sprayer are substantially increased by the invention.

In a development of the invention, the return metering pump can be connected to the carrier liquid line in a region downstream of the carrier liquid pump, in particular directly upstream of a branching into individual partial width sections.

In this manner, the content of the disposal container can be fed in a similar manner to the active compound counter to the water pressure of the carrier liquid. The return metering pump here is expediently of the same type as the metering pump itself, so that an identical controller, preferably pulse controller, can be used.

In a development of the invention, at least one active compound is added to the carrier liquid, the spray nozzles are arranged next to one another on a linkage and a volumetric capacity of the disposal container is calculated in liters from the product of the number of different active compounds to be metered and the linkage width in meters divided by a factor of between 0.2 and 0.5, in particular 0.35.

In this manner, a rapid and reliable calculation of the required size of the disposal container can be carried out. In contrast to conventional field sprayers, in which up to now a pure water container has always had to be carried along for the flushing operation, the size of the disposal container is not to be made dependent on the size of the spraying mixture container but rather on the size of the active compound supply system.

In a development of the invention, a cleaning nozzle is arranged in the upper region of the disposal container and a minimum level sensor is arranged in the lower region, the cleaning nozzle being fed with carrier liquid when the level drops below a minimum level.

By the means of these measures, it can be ensured that, during the return metering operation, after the level drops below the minimum level, the container walls of the disposal container are flushed with carrier liquid. As a result, the active compound concentration in the disposal container will be reduced more and more until finally only carrier liquid, corresponding to pure water, is still arranged in the bottom of the disposal container. At the same time, it can be ensured that, at least in the return metering operation, the return metering pump does not suck up air and, as a result, also does not inject air into the carrier liquid flow of the field sprayer.

The spraying device according to the invention advantageously has an active compound return-flow line from the metering pump to the active compound preliminary container, in which the metering pump, the active compound forward-flow line and/or the active compound return-flow line have a compressed-air connection in order to convey active compound back into the active compound preliminary container by means of compressed air in a return delivery operation.

This provides the preconditions for delivering the concentrated active compound contained in the active compound lines and the metering pumps back into the active compound preliminary container after the spraying operation has finished, without in the process mixing the active compound with the carrier liquid. The contents of the active compound lines and of the metering pump can therefore be used again during the next spraying operation. This is of great significance precisely in the case of very hazardous and/or very expensive active compounds. Only if very low metered portions or highly concentrated active compounds require a predilution is a return delivery operation not expedient.

In a development of the invention, the active compound forward-flow line is provided with a shut off valve or a multiway valve downstream of the active compound preliminary container, in particular directly adjacent to the active compound preliminary container, and the compressed-air connection is arranged downstream of the shut off valve, in particular directly adjacent to the shut off valve, or on the multiway valve on the active compound forward-flow line.

By means of these measures, a return delivery of the active compound in the return delivery operation can take place in the direction of flow of the active compound delivery operation. As a result, use can be made, for example, of directional valves and these valves do not have to be adapted or changed in respect of their direction of passage for the return delivery operation. The same also applies, for example, to the suction or outlet valves of the metering pumps.

In a development of the invention, the multiway valve is arranged directly downstream of an outlet opening of the active compound preliminary container and either connects the outlet opening of the active compound preliminary container to the active compound forward-flow line, the active compound forward-flow line to a compressed-air connection or the outlet opening to a discharge connection.

In this manner, a plurality of functions can be performed with one multiway valve.

In a development of the invention, the multiway valve is provided with devices in order to switch further valves as a function of a position of the multiway valve.

This provides the preconditions for also undertaking further switching operations in the system by actuation just of one central multiway valve. For example, when the active compound forward-flow line is connected to a compressed-air connection, the compressed-air supply to the compressed-air connection can be opened up at the same time. When the outlet opening of the active compound preliminary container is connected to a discharge connection, at the same time, for example, a connection between the active compound storage container and the active compound preliminary container can be opened in order also to completely empty the active compound storage container at the same time as the active compound preliminary container. For example, the multiway valve can be provided for this with a cam plate and with trailing push-button switches or switching sensors which optionally output signals to a control unit or directly activate other switching valves.

The active compound supply system according to the invention or the spraying device according to the invention advantageously has a disposal container for collecting residual amounts of a mixture of carrier liquid and active compound, in particular from flushing operations, in which an injector, through which carrier liquid can flow, is provided to generate a negative pressure, and, in particular, a device for flushing the active compound drum is provided, which device can be connected both to a carrier liquid pressure line and to the negative pressure connection of the injector.

By means of an injector, flushing mixture can be sucked off, for example out of the active compound container, and conveyed into the disposal container. The provision of an injector makes it possible at the same time to provide a dilution of the flushing mixture. Also a flushing of the active compound drum by means of the spraying device according to the invention is made possible in a convenient and reliable manner, since the amounts of flushing mixture obtained during the flushing of the active compound drum are sucked off by negative pressure. It is possible, as a result, to flush an active compound drum in an upright position, i.e. with the opening upward, so that the highly risky tilting of the container for flushing the drum can be omitted.

In a development of the invention, the device for flushing the active compound drum is provided with a cleaning spray nozzle and a suction lance, the cleaning spray nozzle and the suction lance forming a rod-like component for introduction into a drum opening.

To flush the active compound drum, the active compound drum can therefore remain standing in an upright position and the cleaning nozzle and the suction lance are introduced from above into the drum opening. A cover which seals off the opening of the active compound drum for the flushing operation itself is expediently provided on the rod-like component. The cleaning liquid passing through the cleaning spray nozzle onto the container walls then flows downward on the latter and is sucked off there by means of the suction lance.

In a development of the invention, the suction lance extends through a supply channel for the cleaning spray nozzle.

This enables the rod-like component for introducing into the drum opening to be of very compact design, and it is possible to realize a cleaning spray nozzle covering an angular region of 360°. The cleaning spray nozzle may even be spherical or in the shape of a segment of a sphere in order to be able to spray all of the container walls.

In a development of the invention, the suction lance can be displaced relative to the cleaning nozzle.

By means of this measure, active compound drums of differing size can also be reliably flushed. The rod-like component with cleaning nozzle and suction lance is then introduced, for example, into the drum opening and the suction lance is then pushed forward relative to the cleaning nozzle as far as the floor of the active compound drum, so that the sediment in the active compound drum can also be sucked off.

In a development of the invention, a drain line of the injector opens into the disposal container.

As a result, the flushing mixture amounts obtained during the flushing of the active compound drum can be brought by means of the injector directly into the disposal container. Then, for example, during the next spraying operation the return metering in an ineffective dilution into the carrier liquid flow is possible.

BRIEF DESCRIPTION OF THE DRAWINGS

Further features and advantages of the invention emerge from the claims and the description below of preferred embodiments of the invention in conjunction with the drawings, in which:

FIG. 1 shows a spraying device according to the invention in accordance with a preferred embodiment of the invention in a predelivery and spraying operation position, FIG. 2 shows the spraying device of FIG. 1 in the return delivery operation, FIG. 3 shows the spraying device of FIG. 1 in a position for discharging the active compound, FIG. 4 shows the spraying device of FIG. 1 in a flushing operation, FIG. 5 shows a spraying device according to the invention in accordance with a further embodiment, in a partial illustration, FIG. 6 shows a spraying device according to the invention in accordance with a further embodiment, in a partial illustration, and FIG. 7 shows a sectional view of a device in the spraying device according to the invention for flushing the active compound drum.

DETAILED DESCRIPTION OF THE INVENTION

The aim of the development in field spraying technology is to meter the active compounds in as close as possible to the spray nozzles, ideally directly at the nozzle holders. If the active compounds in the appropriate metered portion are not fed in until the nozzle holders, the active compounds have to be delivered to the nozzle holders where they are provided to the metering pumps. In addition, the following tasks have to be fulfilled:

1. Even before the beginning of the actual spraying operation the active compounds have to be delivered to the metering pumps in order, at the beginning of spraying, to ensure that all of the metering pumps and spray nozzles are supplied with active compound or a mixture of active compound and carrier liquid. In consequence, a predelivery of the active compound has to be possible.
2. During the spraying operation, the active compounds have to be delivered continuously from the active compound storage containers, which are expediently arranged on the front part of the sprayer for load distribution reasons and accessibility reasons, to the metering pumps on the spray nozzles on the linkage. The active compounds are ideally provided on the linkage with a low positive pressure. The function of charging or recharging active compound therefore has to be realized.
3. After the spraying operation is finished, there has to be the possibility of delivering the active compounds, which are in concentrated form in the pipeline system and in the metering pumps, back into the active compound container. A return delivery function therefore has to be realized.
4. Furthermore, there has to be the possibility of discharging the active compounds, which are stored on the sprayer and are left over, into the delivery drums and of cleaning the components used in the process as well.
5. Furthermore, a reliable internal cleaning of all of the components which have come into contact with the active compounds, such as pipeline, fittings, pumps and containers, has to be ensured. An internal cleaning or flushing function therefore has to be realized.
6. The metering range to be covered in agricultural technology is very wide and comprises metering specifications of approximately 200 ml per hectare to 6 l per hectare. If the metering pumps used are not capable of entirely covering these extreme values, the option should be offered of providing highly concentrated active compounds to the nozzle pumps in prediluted form. This corresponds to a predilution function.
7. The spraying device according to the invention should also offer the possibility of continuously monitoring to ensure that the metering pumps keep to the metering specifications, and, if appropriate, of undertaking corrections. A calibration function simultaneous with the spraying operation is therefore to be aimed for.

8. If more than one active compound is metered at the same time or is carried along on the field sprayer, the possibility has to be offered to charge or discharge each of these active compounds individually and independently of the others and to clean the pipelines and metering pumps and further components specifically for this active compound. This is because the farmer generally sprays a plurality of active compounds in a cocktail. In this case, some active compounds are used for a plurality of cultures and others are used only for certain partial areas. For this reason, the possibility has to be offered to exchange individual active compounds as required.

In the illustration of FIG. 1, a spraying device according to the invention is partially illustrated. For clarity reasons, only those components are illustrated which are required for the metered addition of an active compound. For metered addition of a plurality of active compounds, the essential components would have to be correspondingly present in multiple form.

The spraying device according to the invention has an active compound storage container 10 with an internal cleaning nozzle 12. This active compound storage container is situated, for example, on the front part of a field sprayer and is filled with active compound before being put into operation. The active compound storage container 10 is provided at its deepest point with a discharge opening and is connected to an active compound preliminary container 16 via a discharge line 14. The discharge line 14 can be shut off or opened up directly below the discharge opening of the active compound storage container 10 by means of a filling valve 18, which is activated, for example, pneumatically or electrically. For the sake of clarity, the compressed-air lines required for activating the filling valve 18 are not illustrated. The active compound preliminary container 16 is provided in its interior with a cleaning nozzle 20. If the filling valve 18 opens up the discharge line 14, active compound can flow from the active compound storage container 10 into the active compound preliminary container 16 following gravity.

The active compound preliminary container is provided with two level sensors 22 and 24. The level sensor 22 monitors a defined maximum level and the level sensor 24 monitors a defined minimum level. The active compound preliminary container 16 is provided at its deepest point with an outlet opening which is followed by a multiway valve 26.

In the illustrated position of the multiway valve 26, the latter connects the active compound preliminary container 16 to a circulation pump 28 which delivers the active compound out of the active compound preliminary container 16 into an active compound forward-flow line 30. The active compound is guided via the active compound forward-flow line 30 to the linkage 32 and to all of the nozzle holders 34 of all of the partial width sections. The nozzle holders 34 are merely illustrated schematically and have in each case at least one spray nozzle, at least one metering pump 35 and a mixing chamber. The nozzle holders 34 have connections for a carrier liquid line 36 and for the active compound circulation line, which is formed from the active compound forward-flow line 30 and an active compound return-flow line 38 which is guided back again from the spray linkage 32 to the active compound preliminary container 16. The active compound circulation line is connected to all of the metering pumps 35 on the linkage 32 of the field sprayer. The mixing of active compound and carrier liquid therefore does not take place until in the individual nozzle holders. The individual metering pumps 35 in the nozzle holders and the activation lines required are illustrated schematically in the illustration of FIG. 1, but may be designed, for example, as what are referred to as hydraulically activated pressure ring pumps, as is explained below in conjunction with a predilution function of the system of FIG. 1. In the charging and circulation operation of the spraying device, as is illustrated in FIG. 1, active compound therefore circulates via the active compound forward-flow line 30, via the linkage 32 and via the active compound return-flow line 38 back into the active compound preliminary container 16 and, via the multiway valve 26, back again to the circulation pump 28. As circulation pump 28 use is made of a hydraulically or electrically driven centrifugal pump, the delivery power of which is matched to the width of the linkage. Only small demands are made of this circulation pump 28. An important property of this circulation pump 28 is that the flow can pass through it in both directions even when it is shut down. This is explained in conjunction with a return delivery operation (which is yet to be explained) and a flushing operation.

The described circulation of the active compound takes place during a predelivery operation in order, before the beginning of the spraying, to distribute the active compound uniformly in the circulation line, so that the active compound is available to all of the metering pumps 35 on the individual nozzle holders 34. As has already been explained, in the illustration of FIG. 1 only the components required for the metering of an active compound are illustrated. For example, separate active compound storage containers, active compound preliminary containers and circulation lines would be required per active compound to be metered.

The circulation pump 28 operates even in the spraying operation with an unchanged position of the multiway valve 26 in order to provide a sufficient amount of active compound continuously to all of the metering pumps in the nozzle holders 34. The metering in of the active compound to the nozzle holders 34 consequently causes the liquid level in the active compound preliminary container 16 to drop. The level sensors 22, 24 are connected to a control unit which, when the level drops to the minimum level, opens the filling valve 18, in reaction to a signal from the minimum level sensor 24, and permits active compound to flow again from the active compound storage container 10 via the discharge line 14 into the active compound preliminary container 16. As soon as the maximum level is reached, in reaction to a signal from the maximum level sensor 22 the control unit 40 closes the filling valve 18. For the sake of simplicity, the control lines required for this are not illustrated. A liquid level in the active compound preliminary container 16 therefore constantly shuttles between the level of the minimum level sensor 24 and the level of the maximum level sensor 22, with a topping up only taking place when the minimum level is actually reached.

In the spraying device according to the invention, the multiway valve 26 performs a central function and is designed, for example, as a commercially available ball valve, on the switching shaft of which is arranged a cam plate which uses electric trailing push-button switches or switching sensors to activate further switching valves in the spraying device according to the invention. For the sake of clarity, the control lines required for this are not illustrated. As an alternative to a direct activation of other valves by the multiway valve 26, the position thereof may also be interrogated by the control unit 40 which then switches the corresponding valves. Specifically, the position of the multiway valve 26 influences the switching position of a flushing valve 42, of the filling valve 18 and of the pneumatic valve 44, as is explained below. As a result, essentially the entire management of the spraying device according to the invention can be effected in a simple and reliable manner via the multiway valve 26.

As an alternative to the active compound preliminary container 16 being filled, as already described, directly from the active compound storage container 10 via the discharge line 14, the active compound preliminary container 16 can also be filled with active compound which is already prediluted, for which purpose a predilution pump 46 is provided. The predilution pump 46 is designed as what is referred to as a pressure ring pump and has two piston plates which are linearly movable, are prestressed by means of an elastic ring into the inoperative position illustrated in FIG. 1 and at the same time are sealed off from their working space by means of this elastic ring. A movement of the two piston plates is possible merely between two end stops, with one of the end stops being formed by the housing of the predilution pump and the other end stop being formed in each case by an adjustable threaded bolt. The piston plates of the predilution pump are acted upon hydraulically, with an activation being undertaken by means of pressure pulses. Per pressure pulse, the predilution pump sucks up an exactly predefined amount of active compound or carrier liquid and then ejects it again. The pressure pulses are produced here by a rotary control slide valve 48 which is flange-mounted onto the housing of the predilution pump 46 and is connected to pressure lines (not illustrated). The rotary control slide valve 48 has a rotary slide valve with a control slot, which is driven by means of an electric stepping motor which in turn is activated by the control unit 40 via control lines (not illustrated). The piston plate 50 of the predilution pump 46 is designed with a significantly smaller cross section than the piston plate 52. The two piston plates 50, 52 are acted upon by means of the common rotary control slide valve 48 and therefore move synchronously to each other. The piston plate 50 acts upon a dedicated delivery space which is connected via a suction valve 54 to the outlet of the active compound storage container 10. The delivery space of the piston plate 50 is furthermore provided with an outlet valve 56 which is connected to the discharge line 14 downstream of the filling valve 18. The piston plate 52 is likewise provided with a dedicated delivery space. The delivery space of the piston plate 52 is connected via a suction valve to a line 60 which is connected to the carrier liquid container 62. In the embodiment illustrated, the predilution pump 46 can suck up water via the line 60. The delivery space of the piston plate 52 is provided with an outlet valve 62 which in turn is connected to the discharge line 14 downstream of the filling valve 18.

Owing to the different sizes of the piston plates 50, 52 and to the piston plates 50, 52 being acted upon together by means of the rotary control slide valve 48, the predilution pump 46 therefore always delivers active compound and carrier liquid in an exactly predefined ratio. If, on account of a very small metering specification, for example 200 ml per hectare, a predilution is required, since when the metering pumps in the nozzle holders 34 are correspondingly activated, sufficient mixing between active compound and carrier liquid could no longer be ensured, the control unit 40 activates the rotary control slide valve 48 and at the same time closes the filling valve 18. Active compound is therefore delivered via the piston plate 50 from the active compound storage container 10 into the discharge line 14 and, by means of the piston plate 52, water is delivered from the storage tank in an exactly defined ratio thereto likewise into the discharge line 14. In the event of the predilution option, the preliminary container 16 is therefore filled with active compound which is already prediluted. On the basis of the constant mixing ratio of active compound to carrier liquid, which is brought about by the predilution pump 46, the control unit 40 knows the concentration of the mixture now present in the active compound preliminary container 16 and can correspondingly activate the metering pumps in the nozzle holders 34 to obtain the current metering specification.

Irrespective of whether the active compound preliminary container 16 is filled with concentrated active compound or with a prediluted mixture, the liquid from the active compound preliminary container 16 is kept in circulation by means of the circulation pump 28 during the spraying operation. As a result, in the case of an active compound which may also comprise an emulsion or suspension, deposits can be avoided or at least reduced. In addition, the circulation line begins at the active compound preliminary container 16 on the front part of the field sprayer and also ends there again. As a result, the flow and pressure ratios in the circulation line can also be controlled by the front part of the field sprayer, and control elements for the management of the active compound are not required on the linkage 32. This is of advantage, since the spray linkage 32 is constantly in motion during the traveling mode and, in addition, is foldable, limited in terms of loading and, in addition, is sensitive.

By means of the control unit 40 and the minimum level sensor 24 and the maximum level sensor 22, a level in the active compound preliminary container 16 is firstly monitored and controlled. In addition, it is possible, by means of the two level sensors 22, 24 and the control unit 40, to realize a simultaneous calibration of the spraying device. If the active compound preliminary container 16 is filled up to its maximum filling level, the filling valve 18 is closed, corresponding to a signal of the maximum level sensor 22, or, in the predilution mode, the predilution pump 46 is switched off. At the same time, the control unit 40 begins to count the metering pulses sent to the metering pumps in the nozzle holders 34. If the minimum level sensor 24 then responds again in order to start a topping up operation, the control unit 40 adds up the metering pulses sent since the closing of the filling valve 18 or the switching off of the predilution pump 46. Since, in addition, the volume of the active compound preliminary container 16 between the level of the minimum level sensor 24 and the level of the maximum level sensor 22 is stored in the control unit, the latter can calculate the amount of active compound actually consumed per pulse by dividing this volume by the number of metering pulses counted.

The control unit 40 then compares the value calculated for the amount of active compound actually consumed per metering pulse with the stored delivery amount of the metering pumps per metering pulse. This amount of active compound per metering pulse of the metering pumps is stored in any case in the control unit 40 as a crucial calculation quantity for pulse control of the amount of active compound metered in. In the event of deviations between amount of active compound actually consumed and amount of active compound stored, the control unit 40 can then undertake, within the framework of a tolerance which is to be specified, corrections to the stored desired value for the amount of active compound per pulse. During the next topping up operation of the active compound preliminary container 16, the corrected value can then be used as desired value for the amount of active compound per pulse.

In addition, further monitoring operations are possible by the provision of run time functions.

If the time for the topping up of the active compound preliminary container is always detected by the control unit 40 and an average quantity is calculated continuously therefrom, when this average quantity is exceeded by a threshold value to be defined it is therefore highly likely that the active compound storage container 10 is empty, that there is clogging or that the filling valve 18 and the predilution pump 46 are malfunctioning. The control unit 40 will correspondingly output a warning signal and thereby inform an operator.

In addition, if the time between the individual topping-up operations of the active compound preliminary container 16 is detected by the control unit 40 and an average quantity is continuously calculated therefrom, if this average quantity is exceeded by a threshold value which is to be defined it is highly likely that one or more metering pumps in the nozzle holders 34 or the drive thereof is malfunctioning. If, in contrast thereto, the active compound preliminary container 16 has to be topped up after a significantly shorter time than the average quantity, the starting point is to be a malfunctioning of one or more metering pumps or the drive thereof but is more likely to be a leakage in the active compound system. In both cases, the control unit 40 outputs a warning signal and thereby informs an operator.

The calibration in the case of the spraying device according to the invention is based on the concept that the volume in the active compound preliminary container 16, in the circulation pump 28 and in the circulation line and the metering pumps in the nozzle holder 34 is difficult to define. However, this active compound volume can only decrease by active compound being removed, with this being possible only by the operation of the metering pumps in the nozzle holders 34. The detection of the volume or of the change in volume in the active compound preliminary container between maximum level and minimum level is therefore sufficient to realize a calibration function.

By monitoring the above-described times, there is also the possibility of registering any leakages which occur and of taking appropriate measures in order to eliminate them. In addition, by provision of an active compound preliminary container, if the metering pumps are switched off in the event of a leakage, only the content of the active compound preliminary container 16 and of the circulation line can escape into the environment, but not the entire active compound store in the active compound storage container 10.

Below the minimum level, an emergency volume is provided in the active compound preliminary container 16, which emergency volume is dimensioned in such a manner that a limited emergency operation, for example as far as the edge of the field if the active compound storage container 10 is empty, is possible.

Before the beginning of the spraying, the farmer fills the carrier liquid container 62 with water. He then fills the active compound storage containers 10, with it being possible for this to take place directly via the drum or else by means of an external pump. During the topping up, the multiway valve 26 is in a neutral position, in which an outlet pipe 64 is connected to a compressed-air connection 66, which is then unpressurized. If the preparations for the spraying are finished, the multiway valve 26 is moved into the position illustrated in FIG. 1. As has already been explained, in this position the active compound preliminary container 16 is connected to the circulation pump 28 and the readiness for spraying is indicated to the control unit 40 by means of a sensor on the multiway valve 26. After the metering specification is input by the operator, the control unit 40 takes the decision as to whether prediluted or concentrated active compound is to be used. The filling of the active compound preliminary container 16 from the active compound storage container 10 is then brought about. The operation of the circulation pump 28 subsequently causes the predelivery operation, which has already been described, to begin by the active compound forward-flow line 30 and the active compound return-flow line 38 and therefore the entire circulation line being filled and vented. The spraying device is ready for spraying when the active compound preliminary container 16 is again filled to the maximum level, the active compound circulates in the circulation line and is present with a small positive pressure at the metering pumps in the nozzle holders 34.

In the position of the spraying device according to the invention that is illustrated in FIG. 1, the spraying operation then also takes place by the control unit 40 monitoring the metering by means of the metering pumps in the nozzle holders 34, and a carrier liquid pump 66 pumping carrier liquid to the nozzle holders 34 and ultimately to the spray nozzles.

The illustration of FIG. 2 shows the spraying device of FIG. 2 in a return delivery operation.

If the spraying is ended or an active compound has to be exchanged for another one, in the case of the spraying device according to the invention the active compound situated in the circulation pump 28 and the circulation line can be delivered back again into the active compound preliminary container 16. For this purpose, the multiway valve 26 is moved into the position shown in FIG. 2. In this position, the multiway valve 26 connects the compressed-air connection 26 to the active compound forward-flow line 30 upstream of the circulation pump 28. At the same time, the pneumatic valve 44 is opened, so that compressed air flows via the multiway valve 26 and the active compound pump 28, the active compound forward-flow line 30, through the metering pumps in the nozzle holders 34 and via the active compound return-flow line 38 into the active compound preliminary container 16. As a result, the active compound still situated therein is pressed into the active compound preliminary container 16. In the circulation pump 28, the circulation line and the metering pumps in the nozzle holders 34, only a small residue of active compound therefore still remains, adhering, for example, to the line walls.

After return delivery has taken place, the active compound can be discharged from the active compound preliminary container 16 and the active compound storage container 10, as is illustrated in FIG. 3. For this purpose, the multiway valve 26 is switched in such a manner that it connects the outlet of the active compound preliminary container 16 to the outlet connection 64. The outlet connection 64 is connected to an active compound drum 72 by means of a tube 70. A cable (not illustrated) is vulcanized into the emptying tube 70 or is fastened to the outside of the tube wall. This cable produces an electrical connection between the commercially available brass coupling parts at the ends of the tube 70. If the tube is removed from its parking and cleaning station 74, an electrical connection between the sensor on the cam plate of the multiway valve 26 and a relay of a flushing valve 42 is interrupted. This prevents the flushing valve 42 from opening, as would be specified per se and in itself in this position of the multiway valve 26, which will be explained below.

At the same time, the filling valve 18 is opened, so that the content of the active compound storage container 10 and of the active compound preliminary container 16 can flow back into the active compound drum 72 via the discharge tube 70. If the active compound storage container 10 and the active compound preliminary container 16 are emptied, the multiway valve is switched into the neutral position, in which the outlet connection 64 is connected to the compressed-air connection 66, which is then unpressurized. This prevents active compound residues from overrunning or dripping off. The emptying tube 70 is subsequently connected again to the parking and cleaning station 74.

Following the discharging of the active compound, the spraying device according to the invention can be cleaned in a flushing operation, which is explained with reference to FIG. 4. For the flushing operation, the multiway valve 26 is moved into the position which is illustrated in FIG. 4 and in which the discharge connection 64 is connected to the outlet of the active compound preliminary container 16. In contrast to the illustration of FIG. 3, the emptying tube 70 now connects the parking and cleaning position 74 to the outlet connection 64. Owing to the electrical connection by means of the emptying tube 70 between the parking and cleaning position 74 and a sensor on the multiway valve 26, the flushing valve 42 opens. As an alternative, the flushing valve 42 may also be activated via the control unit 40 as a function of the position of the multiway valve 26 and taking the position of the emptying tube 70 into consideration. After the flushing valve 42 is opened, water under pressure coming from the carrier liquid pump 66 flows through the flushing valve 42 and is subsequently divided up. Firstly, the cleaning nozzle 12 in the active compound storage container 10 is acted upon by water under pressure. Secondly, the cleaning nozzle 20 in the active compound preliminary container 16 is acted upon by water under pressure. Finally, water under pressure is conducted into the circulation line between the multiway valve 26 and the active compound pump 28. A nonreturn valve 76 permits the passage of water under pressure here, but, in the spraying operation, blocks a connection between the circulation line and the flushing valve 42. In addition, water under pressure is passed to an injector 78 which is designed in the manner of a water jet pump and the output connection of which opens into a disposal container 80. The division of the flow of water under pressure is unproblematic here, since the cross section of the injector 78 and of the cleaning nozzles 12, 20 is selected in such a manner that only some of the volumetric flow provided by the carrier liquid pump 66 flows through the latter.

As a result, the active compound preliminary container 10 is cleaned by means of the cleaning nozzle 12, and the flushing mixture obtained flows via the discharge line 14 into the active compound preliminary container 16. If the predilution pump 46 has to be flushed, the latter is correspondingly activated, so that flushing mixture and, with increasing cleaning, water which is then clear are pumped out of the active compound storage container 10 through the predilution pump 46 and then likewise collected in the active compound preliminary container 16. The flow of water under pressure introduced upstream of the circulation pump 28 flows through the active compound forward-flow line 30 and the individual metering pumps in the nozzle holders 34 and passes via the active compound return-flow line 38 back into the active compound preliminary container 16 again. The active compound preliminary container 16 itself is also cleaned by the cleaning nozzle 20. All of the flushing mixture therefore accumulates in the active compound preliminary container 16 and is sucked off from the latter by means of the injector 78, which produces a negative pressure, and is delivered into the disposal container 80. In this manner, all of the lines or other components coming into contact with active compound can be flushed with water, and the flushing mixture obtained can be collected on the field sprayer itself, namely in the disposal container 80.

In comparison to conventional field sprayers, the amount of flushing mixture obtained here is significantly smaller, since only the active compound lines and the components required for metering the active compound have to be flushed and these naturally have a significantly smaller cross section than the carrier liquid lines. The carrier liquid lines themselves do not have to be flushed, since they come into contact only with pure carrier liquid, corresponding to pure water. Only the spray nozzles on the nozzle holders 34 and the associated mixing chambers still have to be flushed with clear water, the amount of active compound mixture still remaining in the mixing chambers and the spray nozzles being very small, and it can therefore easily be sprayed out.

The flushing mixture obtained in the disposal container 80 can likewise be sprayed out in a conventional manner in an ineffective dilution during a flushing trip, with it being possible, owing to the relatively small amounts of flushing mixture which are obtained, for the disposal container 80 also to be dimensioned in such a manner that the amount of flushing mixture obtained in the case of a plurality of flushing operations can be accommodated, so that the disposal container 80 does not have to be emptied after each flushing operation.

In addition, the return metering of the content of the disposal container 80 in an ineffective dilution into the carrier liquid is also possible during the next spraying operation. The content of the disposal container 80 can thereby be discharged in an ineffective dilution during the next spraying operation, so that no separate disposal whatsoever is required. Such a return metering of the content of the disposal container 80 is explained in detail below with reference to FIG. 6.

The illustration of FIG. 5 shows the construction of the circulation line in more detail for field sprayers with large working widths. Starting from the active compound preliminary container 16, the active compound forward-flow line 30 branches off here into four secondary lines 82, 84, 86 and 88 which all open again into the active compound return-flow line 38. Each of the secondary lines 82, 84, 86, 88 supplies a certain number of metering pumps in the nozzle holders 34. In the case of numerous nozzle holders and, in consequence, large working widths, a division into a plurality of secondary lines 82, 84, 86 and 88 is expedient in order to ensure a uniform supply of all of the nozzle-holder metering pumps with active compound. Downstream of the branching off of the secondary lines 82, 84, 86, 88 from the active compound forward-flow line 30 but still upstream of the nozzle holders 34, a throttle valve 90, 92, 94, 96 is provided in each secondary line 82, 84, 86, 88. The sum total of the volumetric flows across all of the throttle valves 90, 92, 94, 96 is approximately 20% below the average delivery power of the circulation pump 28 in order to guarantee a rapid and uniform distribution of the active compound. The division, illustrated in FIG. 5, of the circulation line into a plurality of parallel secondary circuits can take place independently of the division of the partial width sections. In the case of relatively small linkage width sections, a division, for example, into three secondary circuits, necessitated by the folding of the linkage, is sufficient.

FIG. 5 also shows the components required for the provision of the carrier liquid at a spray pressure matched to the traveling speed. The carrier liquid, preferably pure water, is delivered from the carrier liquid container 62 by means of the carrier liquid pump 66. A pressure-regulating unit 98 ensures in conjunction with a control unit (not illustrated) a spray pressure, which is matched to the traveling speed, in the following carrier liquid lines which lead to the spray linkage. Following the pressure-regulating unit 98, there is a throughflow meter 100 which supplies signals to the control unit (not illustrated). As a function of the signals of the throughflow meter 100, the control unit calculates the required amount of active compound to be metered in, divides this amount of active compound between the individual nozzle-holder metering pumps which are in operation and converts the specific amount of active compound into activation pulses for the metering pumps.

Following the throughflow meter 100, there is a division into the individual partial width sections, with it being possible for each partial width section to be shut off by means of a partial width section valve 102. The partial width section valves 102 are switched pneumatically, for example, and are likewise activated by the control unit (not illustrated). As can be gathered from FIG. 5, the circulation line of the embodiment illustrated is divided up into secondary lines 82, 84, 86, 88 in accordance with the division of the partial width sections.

The return metering (already discussed) of the flushing mixture, which is contained in the disposal container 80, into the carrier liquid flow during the spraying operation will now be explained with reference to FIG. 6. For the return metering, a return metering pump 104 is provided which sucks up flushing mixture from the disposal container 80 and during the spraying operation feeds it into the carrier liquid line downstream of the pressure-regulating unit 98 and upstream of the throughflow meter 100. The return metering of the flushing mixture therefore takes place counter to the spray pressure of the carrier liquid pump 66. In this case, the mixing ratio of spray mixture to carrier liquid is selected in such a manner that in every case an ineffective dilution of the flushing mixture from the disposal container 80 is present.

The return metering pump 104, like the predilution pump 46 and the metering pumps in the nozzle holders 34, is constructed as a pressure ring pump. The return dilution pump 104 is activated in an analogous manner by means of a rotary control slide valve 106 via the control unit 40. By means of suitable activation of the return dilution pump 104 as a function of the signals of the throughflow meter 100, it can be ensured that the content of the disposal container 80 is only added to the carrier liquid in an ineffective dilution. The mixing ratio can be changed here as a function of the active compound in the disposal container 80. The content of the disposal container 80 is disposed of automatically during the following spraying operation and without action by the operator by being added, as described, to the spray water. In the embodiment illustrated, the field sprayer is not equipped with a constant-pressure device, since otherwise, when partial width sections are switched off, flushing mixture would be conducted back into the carrier liquid container 62. If a constant-pressure device were to be provided, there is the possibility, however, when switching off partial width sections, that the drive of the return metering pump 104 and therefore the return metering will also be switched off at the same time.

According to the invention, the active compound still contained in the system after the spraying operation is finished is metered back in the following working step only after a two-stage, settable dilution. In a first stage of the dilution, after the return delivery operation active compound residues are only still present on the inner walls of the pipelines, fittings and pumps. These are diluted the first time by the subsequent flushing operation. In addition during the cleaning (yet to be described below) of the supply drum. In a second stage of the dilution, the flushing mixture in the disposal container 80 is added to the spray water during the next working step and, as a result, is distributed again over a large amount of the spray water. The return dilution pump 104 is driven hydraulically and delivers in pulses. Pulses for driving the return dilution pump 104, corresponding to a drive of the rotary control slide valve 106, are produced by the control unit 40. By the operator being offered different pulse frequencies, he can control how much flushing mixture per unit of time or per amount of carrier liquid is to be metered in. This controlled return metering makes it possible to distribute the content of the disposal container, in the case of very critical active compounds, even onto the content of a plurality of fillings of the carrier liquid container 62. Such a high dilution cannot be achieved in the case of conventional field sprayers. Instead of the return dilution pump 104, another suitable pump may also be used. The return metering by means of the return dilution pump 104 means that the ratio of the dilution during the disposal of the flushing mixture from the disposal container 80 is not associated with the container volume thereof. The disposal container 80 is therefore provided only for receiving and storing the flushing mixture after the first stage of the dilution.

The introduction of the flushing mixture from the flushing operation into the disposal container 80 takes place via a connection 108 which is connected to the outlet connection of the injector 78 explained in FIG. 4. In addition, a float valve 110 is arranged on the disposal container 80 approximately level with the lower third, said float valve opening up or blocking a line which is connected, on the one hand, to the pressure-regulating unit 98 and, on the other hand, to a cleaning nozzle 112 in the upper region of the disposal container 80. This float valve 110 ensures that there is always a minimum level in the container and therefore prevents the return metering pump 104 from running dry.

In the case of the pressure ring pump illustrated, running dry is not critical but then any air conveyed could lead to problems in the rest of the spray system. The float valve 110 feeds the carrier liquid via the cleaning nozzle 112 into the disposal container 80 and ensures that the inner walls of the latter are continuously cleaned.

By means of the arrangement illustrated, it is also possible, for example, to carry out, after the end of the spraying season, a flushing trip, in which only water is sprayed out and the return metering is set to the lowest possible return dilution stage. In this case, the disposal container 80 and the entire disposal system is cleaned from the inside, and the flushing mixture which arises is discharged without any effect. After sufficient dilution, only clean water remains in the disposal container 80 and this can be discharged by means of a discharge valve 114. The flushing mixture is moreover sucked up from the disposal container 80 and removed upward in order to ensure that leakages in the return metering system could lead to the disposal container 80 running empty.

The volumetric capacity of the disposal container 80 is independent of the volumetric capacity of the carrier liquid container 62. Rather, a required size of the disposal container 80 can be calculated as a function of the linkage width and the number of active compounds which can be metered.

In this case, the volumetric capacity of the disposal container is produced from the number of active compounds which can be metered multiplied by the linkage width in meters, with the product being divided by a factor of 0.35.

As an example, in the case of a field sprayer with which three different active compounds can be metered in and which has a working width of 18 m, a volume of 155 l, corresponding to 3×18: 0.35, is produced. In the case of a field sprayer with four active compounds which can be metered and 24 m working width, a disposal container of 280 l volumetric capacity would have to be provided. A field sprayer with four active compounds which can be metered and 36 m working widths would require a disposal container with a volumetric capacity of 400 l.

The illustration of FIG. 7 shows a device for cleaning the supply drum of the spraying device according to the invention. This enables the active compound supply drum to still be flushed on the field and cleaned as a result. An active compound supply drum 116 is only illustrated in some sections in the region of its upper opening, and the device 118 for cleaning the supply drum is introduced partially into the upper opening of the supply drum 116. The device 118 has a suction lance 120 and a cleaning nozzle 122. The suction lance 120 and the cleaning nozzle 122 form a rod-like component, the greatest outside diameter of which is dimensioned in such a manner that it can be introduced into the upper opening of the supply drum 116. The cleaning nozzle 122 is designed in the shape of a segment of a sphere and, as a result, ensures that essentially all of the container inner walls of the supply drum 116 can be sprayed with carrier liquid. The suction lance 120 is guided concentrically through a supply channel for the cleaning nozzle 122. The device 118 here comprises two components, namely a flange component 124, at the lower end of which the cleaning nozzle 122 is provided and which has an encircling flange 126 which can be placed onto the container opening. Below the encircling flange 126 there is an elastic hollow seal 128 which is filled in its interior with air and, after the device 118 is placed on, tightly closes the opening of the supply drum 116. Above the encircling flange 126 is a connecting pipe 130 for water under pressure. The connecting pipe 130 opens into the supply channel for the cleaning nozzle 122, through which the suction lance 120 extends. The suction lance 120 is arranged here displaceably in the flange component 124 and is sealed off in each case at the passage points. The suction lance is provided in order to be connected to a negative-pressure connection of the injector 78 illustrated and explained in FIG. 4.

In order to clean the supply drum, the suction lance 120 is therefore connected to the connection 132 illustrated in FIG. 4, and the switchover valve 134 in FIG. 4 is rotated in such a manner that the connection 132 is connected to the negative-pressure connection of the injector 78. The connecting pipe 130 for the cleaning nozzle is connected to the connection 136 for water under pressure. The device for flushing the drum is then pushed, according to FIG. 7, into a supply drum which is to be cleaned, and the suction lance 120 is pushed into the container until its suction opening 138 touches the bottom of the supply drum 116. The flange component 124 is possibly pushed further until the hollow seal forms a reliable seal. A flushing valve 140, which is illustrated in FIG. 4, is then actuated by hand. Water under pressure is then conducted by the spray pump via the connection 136 to the cleaning nozzle 122 and at the same time to the injector 78. The nonreturn valve 142 in FIG. 4 prevents water under pressure from passing into the remaining flushing lines. The cleaning nozzle 122 is acted upon as a result with water under pressure and ensures that the container inner walls of the supply drum 116 are cleaned. The flushing mixture obtained in the process is sucked off by the negative pressure, which is produced by the injector 78, via the suction opening 138 of the suction lance 120 and conveyed via the connection 132 to the injector 78 and inserted into the disposal container 80. Ventilation openings 144 in the flange component 124 ensure an equalization of pressure in the supply drum 116.

The flushing mixture which is accumulated in the disposal container 80 after the end of the flushing of the supply drum can then be disposed of, as has already been described above, by return metering into the carrier liquid flow.

The invention claimed is:

1. Active compound supply system for a spraying device comprising a carrier liquid tank, a carrier liquid pump, a plurality of spray nozzles and a carrier liquid line for connecting the carrier liquid tank, the carrier liquid pump and the spray nozzles, comprising at least one active compound preliminary container, at least one metering pump for feeding active compound into the carrier liquid, an active compound forward-flow line from the active compound preliminary container to the at least one metering pump and an active compound return-flow line from the at least one metering pump to the active compound preliminary container.

2. The active compound supply system as claimed in claim 1, wherein there is an active compound storage container which is connected to the active compound preliminary container by means of a line and wherein a valve is provided to shut off said line.

3. The active compound supply system as claimed in claim 2, wherein there is a predilution pump which is connected to the carrier liquid tank and to the active compound storage container, said predilution pump being operable in order to produce a mixture of carrier liquid and active compound with a defined composition, and the outlet side of which is connected to the active compound preliminary container.

4. The active compound supply system as claimed in claim 1, wherein the at least one metering pump is provided in the region of a nozzle holder for one or more spray nozzles, and the active compound forward-flow line and the active compound return-flow line form at least part of a circulation line into which the at least one metering pump is connected.

5. The active compound supply system as claimed in claim 4, wherein the plurality of spray nozzles are arranged on a spray linkage in partial width sections, the circulation line having a plurality of parallel secondary lines which connect the active compound forward-flow line and the active compound return-flow line.

6. The active compound supply system as claimed in claim 5, wherein a different secondary line of the circulation line is guided over each partial width section.

7. The active compound supply system as claimed in claim 6, wherein each secondary line has a throttle valve upstream of the respectively associated metering pumps.

8. The active compound supply system as claimed in claim 1, wherein at least one of the metering pump, the active compound forward-flow line and the active compound return-flow line have a compressed-air connection in order to convey active compound back into the active compound preliminary container by means of compressed air in a return delivery operation.

9. The active compound supply system as claimed in claim 8, wherein the active compound forward-flow line is provided with one of a shut off valve and a multiway valve downstream of the active compound preliminary container, and the compressed-air connection is arranged downstream of one of the shut off valve and the multiway valve on the active compound forward-flow line.

10. The active compound supply system as claimed in claim 9, wherein the multiway valve is arranged directly downstream of an outlet opening of the active compound preliminary container and either connects the outlet opening of the active compound preliminary container to the active compound forward-flow line, the active compound forward-flow line to a compressed-air connection or the outlet opening to a discharge connection.

11. The active compound supply system as claimed in claim 10, wherein the multiway valve is provided with devices in order to switch further valves as a function of a position of the multiway valve.

12. The active compound supply system as claimed in claim 1, wherein a disposal container for collecting residual amounts of a mixture of carrier liquid and active compound is provided, in which an injector, through which carrier liquid can flow, is provided to generate a negative pressure in order to suck flushing mixture into the disposal container.

13. The active compound supply system as claimed in claim 12, wherein a device is provided for flushing an active compound drum, which device can be connected both to a carrier liquid pressure line and to the negative pressure connection of the injector.

14. The active compound supply system as claimed in claim 13, wherein the device for flushing the active compound drum is provided with a cleaning spray nozzle and a suction lance, the cleaning spray nozzle and the suction lance forming a rod component for introduction into a drum opening.

15. The active compound supply system as claimed in claim 14, wherein the suction lance extends through a supply channel for the cleaning nozzle.

16. The active compound supply system as claimed in claim 14, wherein the suction lance is displaceable relative to the cleaning nozzle.

17. The active compound supply system as claimed in claim 12, wherein a drain line of the injector opens into the disposal container.

18. The active compound supply system as claimed in claim 1, further comprising a circulation pump in the active compound forward-flow line between the at least one active compound preliminary container and the at least one metering pump.

19. Active compound supply system for a spraying device comprising a carrier liquid tank, a carrier liquid pump, a plurality of spray nozzles and a carrier liquid line for connecting the carrier liquid tank, the carrier liquid pump and the spray nozzles, comprising at least one active compound preliminary container, at least one metering pump for feeding active compound into the carrier liquid and an active compound forward-flow line from the active compound preliminary container to the metering pump, wherein the active compound preliminary container has at least two level sensors arranged on a different level, the metering pump delivers a defined amount of active compound per working stroke, and a control unit is provided which detects and evaluates at least one of the number of working strokes and the time taken for a level reduction between the level of the first and second level sensors in the active compound preliminary container.

20. The active compound supply system as claimed in claim 19, wherein an active compound storage container which is connected to the active compound preliminary container is provided, and wherein the control unit detects and evaluates a time which passes between the first level and the second level when filling the active compound preliminary container from the active compound storage container.

21. Active compound supply system for a spraying device comprising a carrier liquid tank, a carrier liquid pump, a plurality of spray nozzles and a carrier liquid line for connecting the carrier liquid tank, the carrier liquid pump and the spray nozzles, comprising at least one active compound preliminary container, at least one metering pump for feeding active compound into the carrier liquid and an active compound forward-flow line from the active compound preliminary container to the metering pump, a disposal container for collecting residual amounts of a mixture of carrier liquid and active compound from flushing operations, and a return metering pump, wherein the return metering pump is connected to the disposal container and to the carrier liquid line.

22. The active compound supply system as claimed in claim 21, wherein a control unit for activating the return metering pump is provided.

23. The active compound supply system as claimed in claim 21, wherein the return metering pump is connected to the carrier liquid line in a region downstream of the carrier liquid pump.

24. The active compound supply system as claimed in claim 21, wherein at least one active compound is added to the carrier liquid, the spray nozzles are arranged next to one another on a linkage and a volumetric capacity of the disposal container is calculated in liters from the product of the number of different active compounds to be metered and the linkage width in meters divided by a factor of between 0.2 and 0.5, in particular 0.35.

25. The active compound supply system as claimed in claim 21, wherein a cleaning nozzle is arranged in the upper region of the disposal container and a minimum level sensor is arranged in the lower region, the cleaning nozzle being fed with carrier liquid when the level drops below a minimum level.

26. A spraying device for spraying liquids, comprising a carrier liquid tank, a carrier liquid pump, a plurality of spray nozzles and a carrier liquid line for connecting the carrier liquid tank, the carrier liquid pump and the spray nozzles, and an active compound supply system comprising at least one active compound preliminary container, at least one metering pump for feeding active compound into the carrier liquid, an active compound forward-flow line from the active compound preliminary container to the at least one metering pump and an active compound return-flow line from the at least one metering pump to the active compound preliminary container.

* * * * *